(12) United States Patent
Tone

(10) Patent No.: US 12,001,657 B2
(45) Date of Patent: *Jun. 4, 2024

(54) INFORMATION PROCESSING DEVICE AND DISPLAY METHOD

(71) Applicant: SHARP KABUSHIKI KAISHA, Sakai (JP)

(72) Inventor: Masanobu Tone, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/116,848

(22) Filed: Mar. 3, 2023

(65) Prior Publication Data

US 2023/0205402 A1 Jun. 29, 2023

Related U.S. Application Data

(62) Division of application No. 17/844,846, filed on Jun. 21, 2022, now Pat. No. 11,620,036, which is a
(Continued)

(30) Foreign Application Priority Data

Jul. 21, 2020 (JP) ................. 2020-124483

(51) Int. Cl.
*G06F 3/0484* (2022.01)
*G06F 3/0354* (2013.01)
(Continued)

(52) U.S. Cl.
CPC ........ *G06F 3/0484* (2013.01); *G06F 3/03545* (2013.01); *G06F 3/04817* (2013.01); *G06F 3/04883* (2013.01); *G06F 3/04886* (2013.01)

(58) Field of Classification Search
CPC ............... G06F 3/0484; G06F 3/03545; G06F 3/04817; G06F 3/04883; G06F 3/04886;
(Continued)

(56) References Cited

U.S. PATENT DOCUMENTS

| 2012/0272192 A1 | 10/2012 | Grossman et al. |
| 2014/0043366 A1* | 2/2014 | Tsukuda ................ G06F 3/14 345/634 |
| 2014/0195953 A1 | 7/2014 | Sakai et al. |

FOREIGN PATENT DOCUMENTS

| JP | 2006-148730 A | 6/2006 |
| JP | 2013-114619 A | 6/2013 |
(Continued)

OTHER PUBLICATIONS

Notice of Allowance and Fee(s) Due issued on Mar. 30, 2022 for U.S. Appl. No. 17/377,163.
(Continued)

*Primary Examiner* — Amare Mengistu
*Assistant Examiner* — Gloryvid Figueroa-Gibson
(74) *Attorney, Agent, or Firm* — ScienBiziP, P.C.

(57) ABSTRACT

The information processing device includes a display panel, an operation receiving section, a controller, and a storage. The display panel includes a first area and a second area. When a user operation on the first area is received on the operation receiving section, the controller displays an image based on the user operation in the first area. The controller performs second processing and third processing. The second processing corresponds to processing of storing a first image displayed in the first area and a second image which is a reduced image of the first image in the storage, and displaying the second image in the second area. The third processing corresponds to processing of displaying, when a user operation of selecting the second image is received on (Continued)

the operation receiving section, the first image corresponding to the selected second image in the first area.

10 Claims, 9 Drawing Sheets

Related U.S. Application Data division of application No. 17/377,163, filed on Jul. 15, 2021, now Pat. No. 11,397,515.

(51) Int. Cl.
*G06F 3/04817* (2022.01)
*G06F 3/04883* (2022.01)
*G06F 3/04886* (2022.01)

(58) Field of Classification Search
CPC . G06F 2203/04803; G06F 2203/04807; G06F 3/0482; G09G 5/14

USPC ......................................................... 345/173
See application file for complete search history.

(56) References Cited

FOREIGN PATENT DOCUMENTS

| JP | 2013-161302 A | 8/2013 |
| JP | 2013-195524 A | 9/2013 |
| JP | 2016-015098 A | 1/2016 |

OTHER PUBLICATIONS

Non-final Rejection dated Oct. 4, 2022 for U.S. Appl. No. 17/844,846 which is the parent application of the instant application.

Notice of Allowance dated Dec. 12, 2022 for U.S. Appl. No. 17/844,846 which is the parent application of the instant application.

\* cited by examiner

| TIME | REPRODUCTION TARGET IMAGE ID | REDUCED IMAGE ID | PAGE NO. |
|---|---|---|---|
| t1 | p001 | s001 | 1 |
| t2 | p002 | s002 | 1 |
| t3 | p003 | s003 | 1 |
| . | . | . | . |
| t8 | p008 | s008 | 1 |
| t9 | p009 | s009 | 2 |
| t10 | p010 | s010 | 2 |
| t11 | p011 | s011 | 2 |
| . | . | . | . |

| TIME | REPRODUCTION TARGET IMAGE ID | REDUCED IMAGE ID | PAGE NO. | OPERATION INFORMATION |
|---|---|---|---|---|
| t1 | p001 | s001 | 1 | C |
| t2 | p002 | s002 | 1 | D |
| t3 | p003 | s003 | 1 | C |
| . | . | . | . | . |
| t8 | p008 | s008 | 1 | P |
| t9 | p009 | s009 | 2 | D |
| t10 | p010 | s010 | 2 | C |
| t11 | p011 | s011 | 2 | C |
| . | . | . | . | . |

INFORMATION PROCESSING DEVICE AND DISPLAY METHOD

CROSS REFERENCE TO RELATED APPLICATIONS

This application is a Divisional Application of U.S. patent application Ser. No. 17/844,846, filed on Jun. 21, 2022. The U.S. patent application Ser. No. 17/844,846 is a Divisional Application of the U.S. patent application Ser. No. 17/377,163, which is based upon and claims the benefit of priority under 35 USC 119 from prior Japanese Patent Application No. 2020-124483, filed Jul. 21, 2020. The entire contents of which are incorporated herein by reference.

BACKGROUND

The present disclosure relates to an information processing device.

Conventionally, there has been known an electronic blackboard provided with a touch display. The electronic blackboard makes drawing in a display area in accordance with the contents produced by the user by a touch operation using a dedicated stylus the like. Document 1 (Japanese Unexamined Patent Application Publication No. 2006-148730) and Document 2 (Japanese Unexamined Patent Application Publication No. 2013-161302) disclose such an apparatus. The apparatus described in Document 1 captures an image displayed on a screen at regular time intervals, and stores the captured image. Also, the apparatus described in Document 2 displays a captured image as a thumbnail in a case where an instruction is given to thumbnail the captured image, or no user operation has been performed for a certain period of time. Further, the apparatus described in Document 2 records an operation for changing a display screen, and reproduces the display screen corresponding to the selected thumbnail in a display area, on the basis of the recorded information.

SUMMARY

An information processing device according to an aspect of the present disclosure includes a display panel, an operation receiving section, a controller, and a storage. The display panel includes a display area including a first area and a second area. The operation receiving section receives a user operation. The controller performs control processing of controlling display in the display area, on the basis of the user operation received on the operation receiving section. The control processing includes first processing, second processing, and third processing. The first processing causes an image drawn on the basis of a first input operation received on the operation receiving section to be displayed in the first area. The second processing causes a first image and a second image that is a reduced image of the first image to be stored in the storage in a case where the user operation is a second input operation which changes the display state of the first area, and causes the second image to be displayed in the second area. The first image is an image being displayed in the first area at the time when the second input operation has been performed. The third processing causes the first image corresponding to the selected second image to be displayed in the first area, instead of the image being displayed in the first area.

A display method according to another aspect of the present disclosure includes causing, when a first input operation on a first area is received by an operation receiving section as a user operation on a display area including the first area and a second area, a controller to display an image based on the first input operation in the first area; causing, when a second input operation different from the first input operation is received as the user operation on the operation receiving section, the controller to store a first image and a second image in a storage, the first image being displayed in the first area, the second image being a reduced image of the first image; causing the controller to display the second image in the second area; and causing, when a third input operation of selecting the second image is received as the user operation on the operation receiving section, the controller to display the first image corresponding to the selected second image in the first area, instead of the image being displayed in the first area. The third input operation is different from the first input operation and the second input operation.

DETAILED DESCRIPTION

Figure 1:
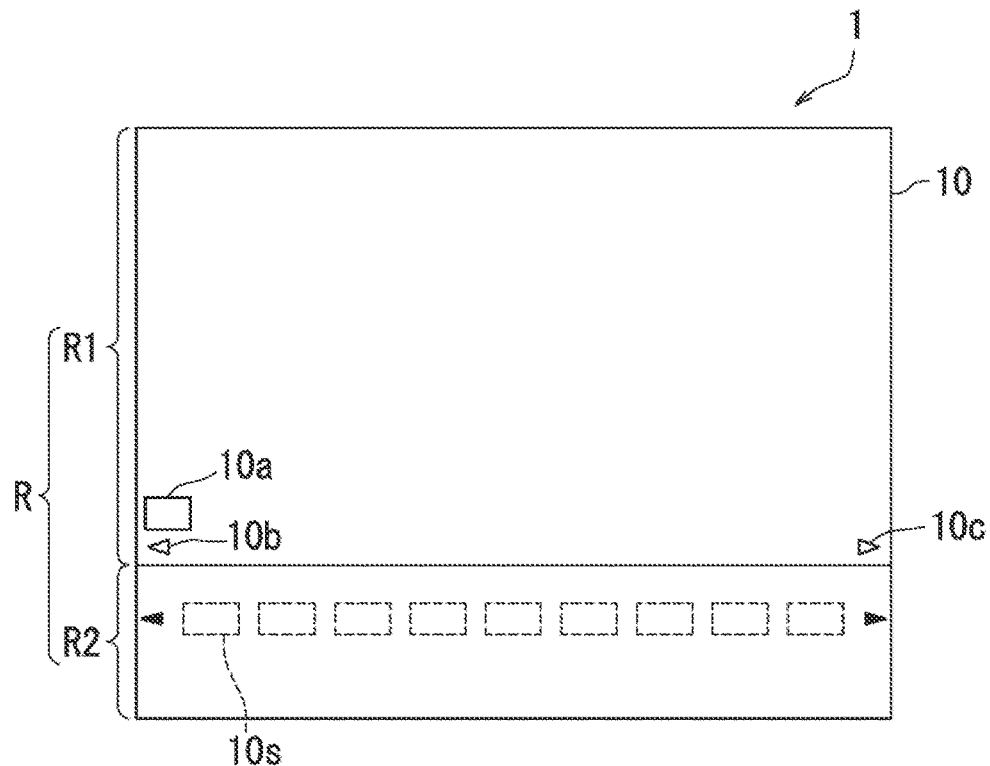
FIG. 1 is a schematic diagram showing the outer appearance of an information processing device according to a first embodiment.

In the following, an information processing device according to an embodiment will be described with reference to the drawings. Note that the same or equivalent parts in the drawings are labelled using the same reference symbols, and will not be redundantly described.

First Embodiment

FIG. 1 is a schematic diagram showing the outer appearance of an information processing device 1 according to a first embodiment. The information processing device 1 is used, for example, as an electronic blackboard. As illustrated in FIG. 1, the information processing device 1 includes a touch display 10 including a display area R. FIG. 1 shows the state in which a drawing application program (hereinafter referred to as a drawing APS [Application Software]) for achieving the function as an electronic blackboard is started in the display area R, and a drawing application screen is displayed therein. The information processing device 1 displays an image in the display area R, on the basis of a touch operation (a user operation) of the user to touch the touch display 10 with a stylus or the like. The display area R, in other words, the drawing application screen includes a first area R1 and a second area R2. In the first area R1, a menu icon 10a for displaying an operation menu, page switching icons 10b and 10c for switching the pages, and an image (not shown) drawn in accordance with the touch operation are displayed. In the second area R2, a reduced image 10s corresponding to an image of when a specific touch operation has been performed, in a series of images drawn in the first area R1 from a start to an end of the drawing, is displayed. In the following, the configuration of the information processing device 1 will be specifically described.

Figure 2:
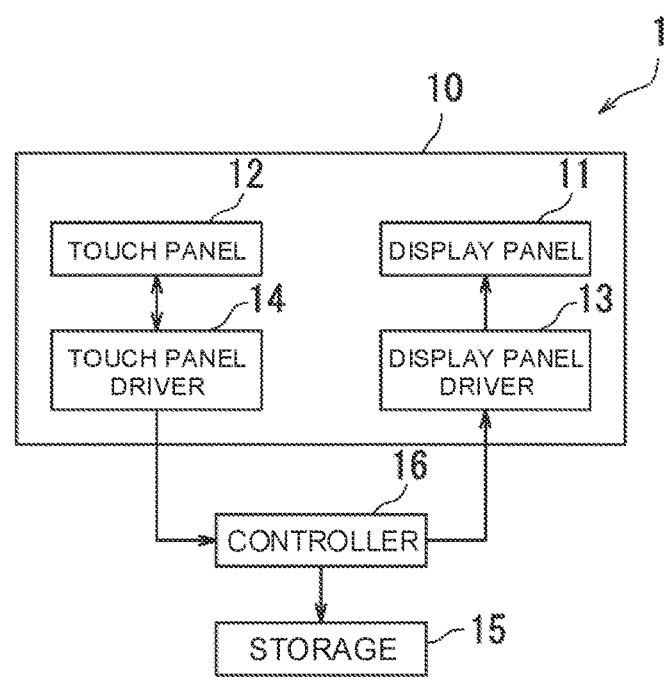
FIG. 2 is a block diagram showing a schematic configuration of the information processing device illustrated in FIG. 1.

FIG. 2 is a block diagram showing a schematic configuration of the information processing device 1 illustrated in FIG. 1. As illustrated in FIG. 2, the information processing device 1 includes the touch display 10, a storage 15, and a controller 16. The touch display 10 includes a display panel 11, a touch panel 12, a display panel driver 13, and a touch panel driver 14.

The display panel 11 is composed of a liquid crystal panel, an organic electro luminescence (EL) panel, and the like. The display panel 11 includes the display area R, and displays, under the control of the display panel driver 13, an image in the display area R.

The display panel driver 13 is composed of an IC (Integrated Circuit) circuit which is electrically connected to the display panel 11 and the controller 16. The display panel driver 13 drives the display panel 11 on the basis of a control signal from the controller 16. The display panel driver 13 supplies, on the basis of an image signal from the controller 16, the image signal indicating an image to be displayed in the display area R to the display panel 11.

The touch panel 12 is composed of, for example, a capacitive touch panel. Under the control of the touch panel driver 14, the touch panel 12 detects a change in capacitance caused by a touch operation on the display area R. Note that the touch panel 12 is not limited to a capacitive touch panel, and may be a touch panel using electromagnetic induction, infrared rays, or the like.

The touch panel driver 14 is composed of an IC circuit which is electrically connected to the touch panel 12 and the controller 16. The touch panel driver 14 drives the touch panel 12 by outputting a driving voltage signal to the touch panel 12, specifies a touch position (coordinates) on the display area R on the basis of a result of detection of the touch panel 12, and outputs a touch operation signal indicating the touch position to the controller 16.

The storage 15 is composed of a non-volatile storage medium such as a hard disk or an electrically erasable programmable read-only memory (EEPROM) (registered trademark). Under the control of the controller 16, the storage 15 stores reproduction image data indicating an image (hereinafter referred to as a reproduction target image) drawn in the first area R1 when a specific touch operation has been performed, reduced image data indicating a reduced image of the reproduction target image, reproduction image information, and the like. Details of the reproduction image information will be described later with reference to FIG. 4.

The controller 16 is composed of a control circuit including a central processing unit (CPU), and a memory (including a read-only memory [ROM] and random-access memory [RAM]). In the present embodiment, the CPU has a clocking function. As the CPU executes a drawing application program stored in the ROM, the controller 16 performs control processing of controlling display in the display area R, on the basis of the user's touch operation.

Specifically, the control processing includes first processing to third processing. The first processing displays the drawing application screen in the display area R when a power source (not shown) of the information processing device 1 is turned on or when an operation of starting the drawing APS is performed. More specifically, the first processing includes initial setting processing of outputting an image signal indicating the menu icon 10a and the page switching icons 10b and 10c (FIG. 1) to the display panel driver 13, and displaying the menu icon 10a and the page switching icons 10b and 10c in the first area R1 of the display area R. In the first area R1, an area other than the menu icon 10a and the page switching icons 10b and 10c will be described as a drawing area. In the present embodiment, the drawing area is displayed in white, for example.

Also, the first processing includes drawing processing of generating an image signal indicating an image to be displayed in the first area R1, on the basis of the touch operation signal output from the touch panel driver 14, and outputting the generated image signal to the display panel driver 13. In other words, the drawing processing corresponds to processing of generating an image to be displayed in the drawing area, on the basis of a drawing operation performed by a user to draw characters, figures, and the like, in the drawing area with his/her finger, etc., and displaying the generated image in the drawing area.

Figures 3, 4:
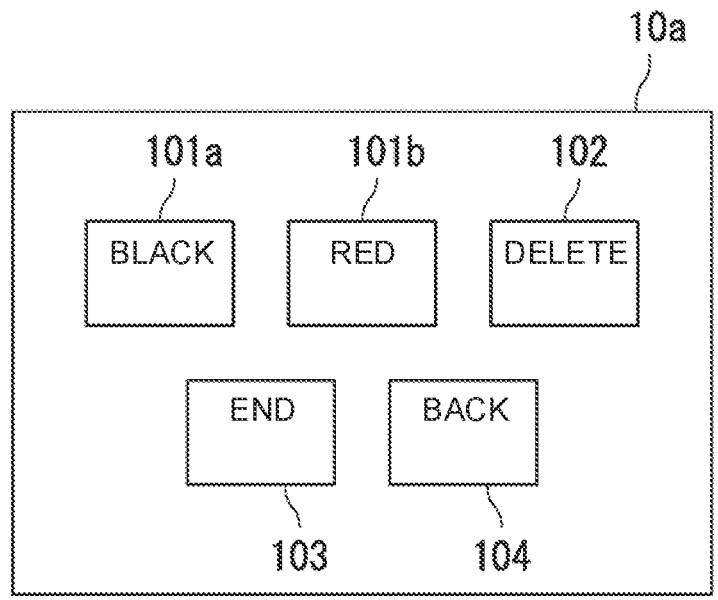
FIG. 3 is a schematic diagram of a menu icon shown in FIG. 1 in enlarged scale.
FIG. 4 is a table showing an example of reproduction image information of the first embodiment.

Here, the menu icon 10a and the page switching icons 10b and 10c will be described. FIG. 3 is a schematic diagram of the menu icon 10a shown in FIG. 1 in enlarged scale. As shown in FIG. 3, the menu icon 10a includes icons 101a, 101b, and 102 to 104.

On the icons 101a and 101b, the characters "Black" and "Red" are written, respectively. The icons 101a and 101b will be referred to as color selection icons. The color selection icons 101a and 101b are icons for allowing the user to select the color of an image to be drawn. For example, the color selection icon 101a is associated with a command for designating the color of an image to be drawn as black, and the color selection icon 101b is associated with a command for designated the color of an image to be drawn as red. In the present embodiment, as the user first touches the color selection icon 101a or 101b by a touch operation, and then moves a stylus or the like on the first area R1, an image in the selected color is drawn in the first area R1. When the color selection icon 101a or 101b is not selected, in the present embodiment, an image to be drawn is represented in "Black" according to a default setting.

On the icon 102, the characters "Delete" are written. The icon 102 will be referred to as a delete icon. The delete icon 102 is associated with a command for deleting an image in an area designated by a touch operation. In the present embodiment, in a case where the user wishes to delete an image, after the user touches the delete icon 102 by a touch operation, the user moves a stylus or the like on the image to be deleted and specifies a deletion range.

On the icon 103, the characters "End" are written. The icon 103 will be referred to as an end icon. The end icon 103 is associated with a command for instructing that the drawing in the first area R1 be ended. In a case where the user wishes to end a series of actions of drawing in the first area R1, the user touches the end icon 103 by a touch operation and ends the drawing.

On the icon 104, the characters "Back" are written. The icon 104 will be referred to as a back icon. The back icon 104 is associated with a command for instructing, when a reproduction target image is displayed in the first area R1, that the reproduction be ended. In a case where the user wishes to reinstate the display area R to the state immediately before the display of the reproduction target image, the user touches the back icon 104 by a touch operation and restores the display state of the first area R1.

Further, the page switching icons 10b and 10c are associated with a command for switching the display to display a page before or after the page on which the drawing is currently being made, with an image drawn in the first area R1 being assumed as one page. As the user touches the page switching icons 10b and 10c by a touch operation, the user switches the display so that a page before or after the current page is displayed. If the page switching icon 10c is touched by a touch operation in a state where there exists no page after the current page, the controller 16 displays the entire drawing area in the first area R1 in white.

The second processing includes storage processing and thumbnailing processing. The storage processing indicates processing of assuming an image that is drawn when a specific touch operation has been performed during a period from a start of the drawing to an end of the drawing as a reproduction target image, and storing reproduction target image data indicating the reproduction target image in the storage 15. In the present embodiment, the specific touch operation corresponds to an operation of selecting any one of the icons except for the back icon 104, that is, the icon from one of the color selection icons 101a and 101b, the delete icon 102, the end icon 103, and the page switching icons 10b and 10c. More specifically, the specific touch operation corresponds to an operation of changing the display state of the first area R1, excluding the drawing operation. In other words, the specific touch operation includes an instruction operation related to drawing, excluding the drawing operation.

The thumbnailing processing includes processing of generating a reduced image of the reproduction target image, and having reduced image data and reproduction image information stored in the storage 15, and processing of displaying, in the second area R2, the reduced images 10s in chronological order on a page-by-page basis.

FIG. 4 is a table showing an example of reproduction image information 150 of the first embodiment. As shown in FIG. 4, in the reproduction image information 150, time, reproduction target image ID, reduced image ID, and the page No. are associated with each other. Time indicates the time when a touch operation signal indicating a specific touch operation has been acquired from the touch panel driver 14. Reproduction target image ID corresponds to information for identifying the reproduction target image. Reduced image ID corresponds to information for identifying the reduced image. Page No. indicates The third processing includes reproduction processing and restoration processing. The reproduction processing indicates reproduction processing of displaying, when a touch operation of selecting the reduced image 10s is performed, a reproduction target image corresponding to the selected reduced image, instead of the image (hereinafter referred to as the immediately preceding image) displayed in the drawing area at the time of the touch operation. The restoration processing indicates processing of displaying the immediately preceding image in the drawing area in response to the touch operation of the back icon 104, and reinstating the display area R to the display state before reproduction.

Operation

Figure 5:
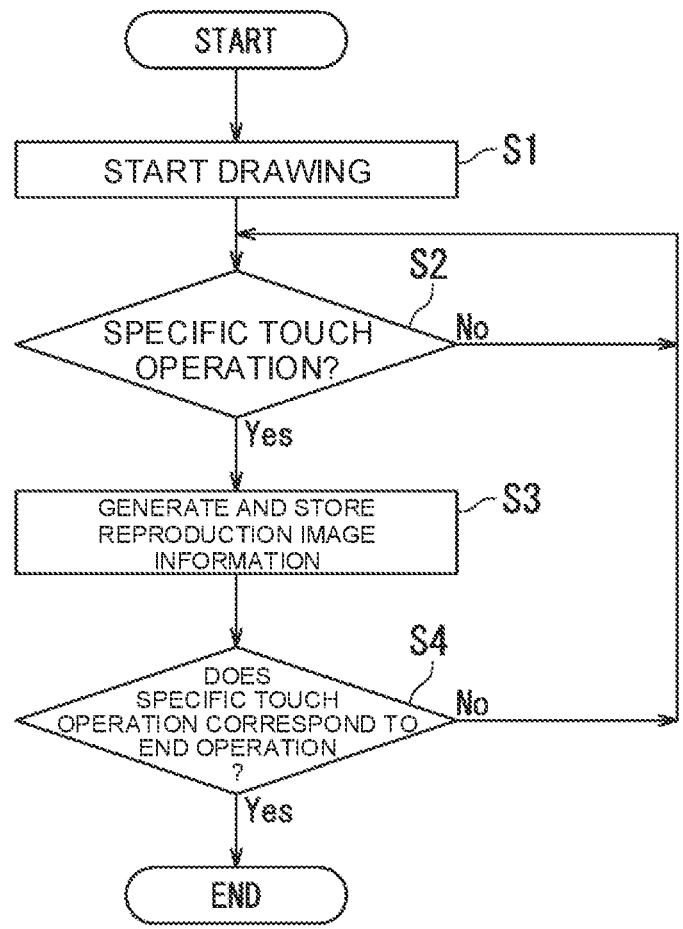
FIG. 5 is an operation flowchart showing first and second processing of the information processing device of the first embodiment.

FIG. 5 is an operation flowchart showing the first processing and the second processing of the information processing device 1 of the first embodiment. The operation flow of FIG. 5 shows the processing to be performed after the initial setting processing has been performed in the information processing device 1. The operation will be described specifically with reference to FIGS. 1 to 5.

Figure 6A:
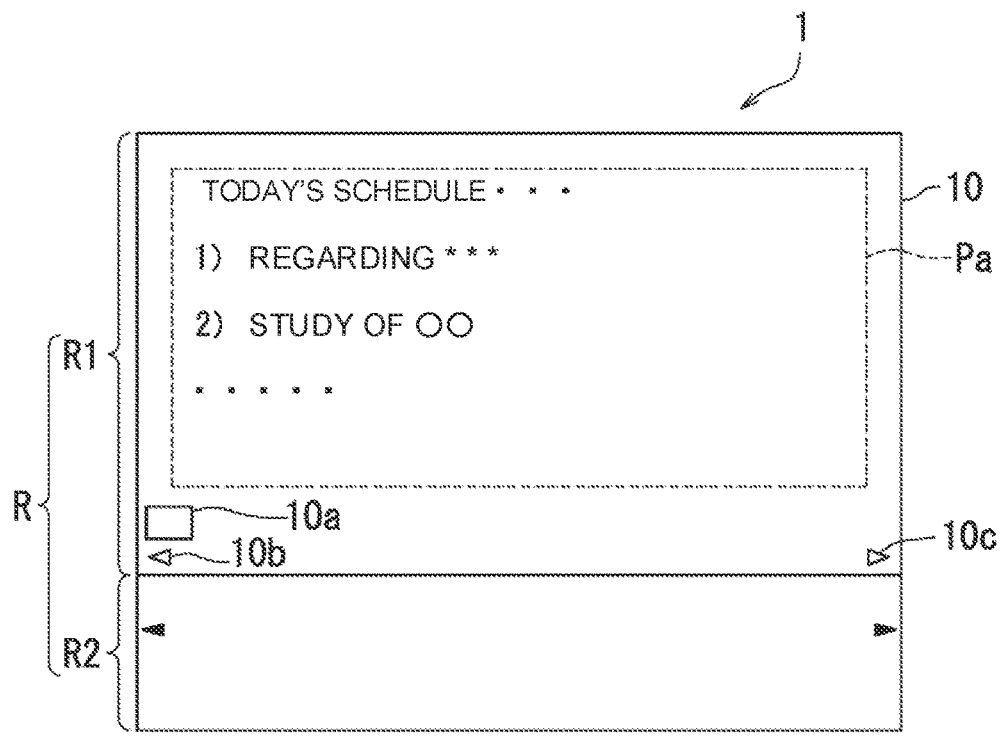
FIG. 6A is a schematic diagram showing an example of an image drawn in a first area.

As the touch operation, the user starts the operation of drawing, for example, characters by moving a stylus or the like in the first area R1 shown in FIG. 1. In the information processing device 1, the touch panel 12 outputs a signal indicating a change in the capacitance at a touch-operated position to the touch panel driver 14, and the touch panel driver 14 outputs a touch operation signal to the controller 16, on the basis of the signal from the touch panel 12. The controller 16 makes drawing in the first area R1 on the basis of the touch operation signal (step S1). FIG. 6A is a schematic diagram showing an example of an image drawn in the first area R1. More specifically, FIG. 6A shows an example of the image which has been drawn in the first area R1 by step S1 of FIG. 5. In FIG. 6A, the color of the image to be drawn is set to "Black" by default, and an image Pa shown in FIG. 6A is represented in "Black".

In FIG. 6A, in a case where the user wishes to change the color for drawing to "Red", the color selection icon 101b is selected. As a result, a touch operation signal is output from the touch panel driver 14 to the controller 16. If the touch operation signal indicates a specific touch operation (step S2: Yes), the controller 16 stores the reproduction target image, the reduced image, and the reproduction image information 150 (FIG. 4) in the storage 15, and causes the reduced image to be displayed in the second area R2 (step S3).

Specifically, the controller 16 assumes, in accordance with the touch operation signal indicating the specific touch operation from the touch panel driver 14, the image Pa that is displayed in the first area R1 when the touch operation signal has been acquired as the reproduction target image, and stores the reproduction target image Pa, and the reproduction target image ID for identifying the reproduction target image Pa to be associated with each other in the storage 15. Also, the controller 16 generates the reduced image 10s of the reproduction target image Pa, and stores the reduced image 10s, and the reduced image ID for identifying the reduced image 10s to be associated with each other in the storage 15. Further, the controller 16 stores, in the storage 15, the reproduction image information 150 in which the time when the touch operation signal indicating the specific touch operation has been acquired, the reproduction target image ID, the reduced image ID, and the page No. indicating the page on which the reproduction target image Pa is drawn are associated with each other. Furthermore, the controller 16 outputs, to the display panel driver 13, an image signal indicating the reduced image 10s to be displayed in the second area R2, and the display panel driver 13 causes the reduced image 10s to be displayed in the second area R2 in the display panel 11.

Figure 6B:
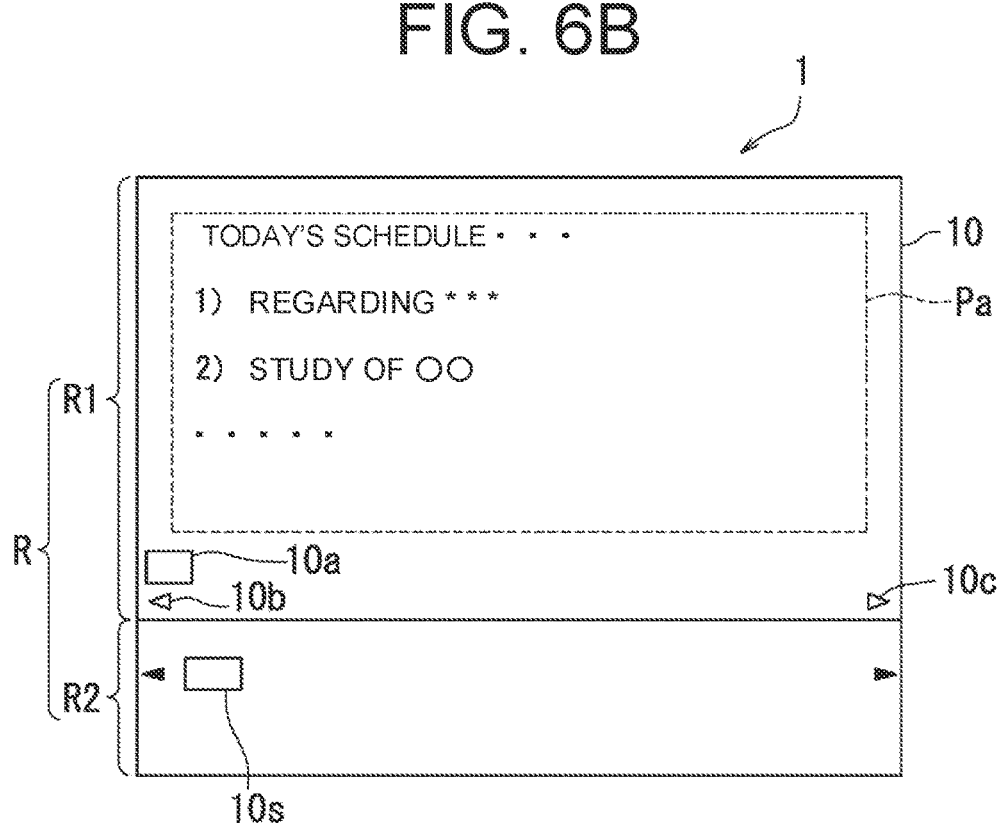
FIG. 6B is a schematic diagram showing a display area transferred from the state shown in FIG. 6A to the state in which a reduced image is displayed.

FIG. 6B is a schematic diagram showing the display area R transferred from the state shown in FIG. 6A to the state in which the reduced image 10s is displayed. More specifically, FIG. 6B is the schematic diagram showing the state in which the reduced image 10s of the reproduction target image Pa is displayed in the second area R2 by the processing of step S3.

Note that in step S2 of FIG. 5, also when an operation of selecting any one of the delete icon 102, the end icon 103, and the page switching icons 10b and 10c is performed as the specific touch operation, the controller 16 similarly performs the processing of step S3.

In the controller 16, if the touch operation signal acquired in step S2 indicates the operation of selecting the end icon 103, that is, if the specific touch operation corresponds to a drawing end operation (step S4: Yes), the information processing device 1 ends the first processing.

Further, in step S4, if the specific touch operation of step S2 does not correspond to the drawing end operation (step S4: No), the controller 16 repeats the processing of step S2 and thereafter.

As the processing of step S2 and thereafter is repeated, images drawn in the first area R1 at the time when the specific touch operations have been performed are sequentially assumed as the reproduction target images. Further, the reduced images 10s of the reproduction target images are successively added to the second area R2 shown in FIG. 6B.

Figure 6C:
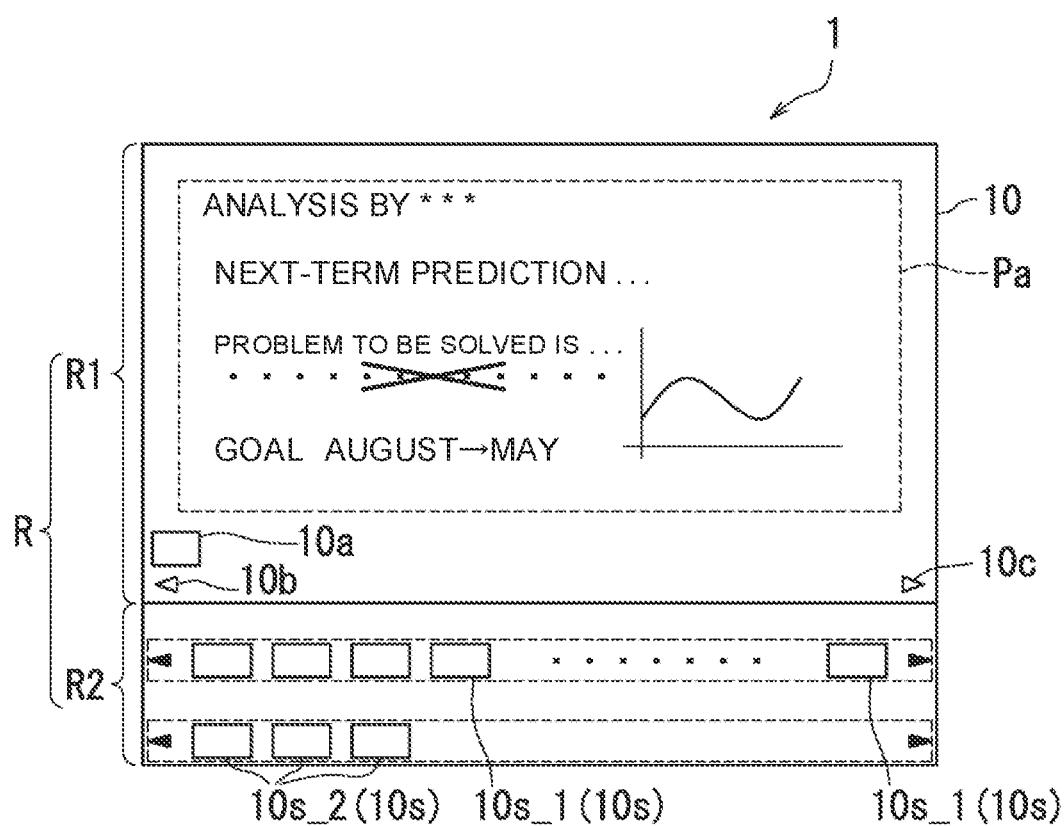
FIG. 6C is a schematic diagram showing a display area transferred from the state shown in FIG. 6B to the state in which reduced images are added to a second area.

FIG. 6C is a schematic diagram showing the display area R transferred from the state shown in FIG. 6B to the state in which the reduced images 10s are added to the second area R2. Specifically, FIG. 6C shows the state in which after the specific touch operation has been performed for a plurality of times on the first page from the state shown in FIG. 6B, the page switching icon 10c is touched by a touch operation and then drawing on the second page is started, and the specific touch operation is performed for a plurality of times on the second page. The image Pa on the second page is displayed in the first area R1 of FIG. 6C. Further, in the second area R2 of FIG. 6C, reduced images 10s_1 corresponding to the first page and reduced images 10s_2 corresponding to the second page are arranged in chronological order on a page-by-page basis. When there is no need to distinguish between the reduced images 10s_1 and 10s_2, they will be described as reduced images 10s.

Figure 7:
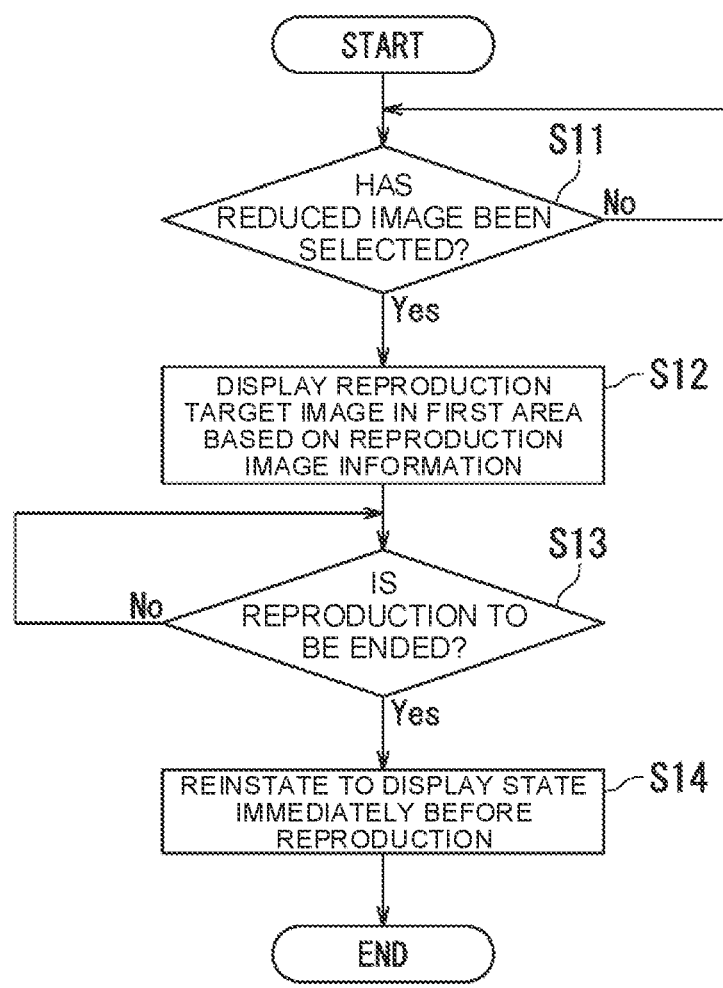
FIG. 7 is an operation flowchart showing third processing of the first embodiment.

Next, the third processing in the information processing device 1 will be described. FIG. 7 is an operation flowchart showing the third processing of the first embodiment. The third processing will be described with reference to FIGS. 2, 6C, and 7.

In FIG. 6C, when the user performs a touch operation of selecting one of the reduced images 10s, a touch operation signal is output from the touch panel driver 14 to the controller 16 in the information processing device 1. If the touch operation signal represents a touch operation of selecting the reduced image 10s (step S11: Yes), the controller 16 causes the reproduction target image corresponding to the selected reduced image 10s to be displayed in the first area R1, on the basis of the reproduction image information 150 stored in the storage 15 (step S12).

Specifically, the controller 16 stores, in the memory, image data (hereinafter referred to as the immediately preceding image data) indicating the image drawn in the first area R1 at the time when the touch operation signal has been acquired from the touch panel driver 14. Also, the controller 16 refers to the reproduction image information 150 to specify the reproduction target image ID corresponding to the selected reduced image 10s. Further, the controller 16 reads reproduction target image data corresponding to the specified reproduction target image ID from the storage 15, and outputs the image signal indicating the reproduction target image data to the display panel driver 13. The display panel driver 13 causes the display panel 11 to display an image corresponding to the image signal output from the controller 16. In this way, the reproduction target image is displayed in the first area R1 of the display panel 11.

Figures 8, 9:
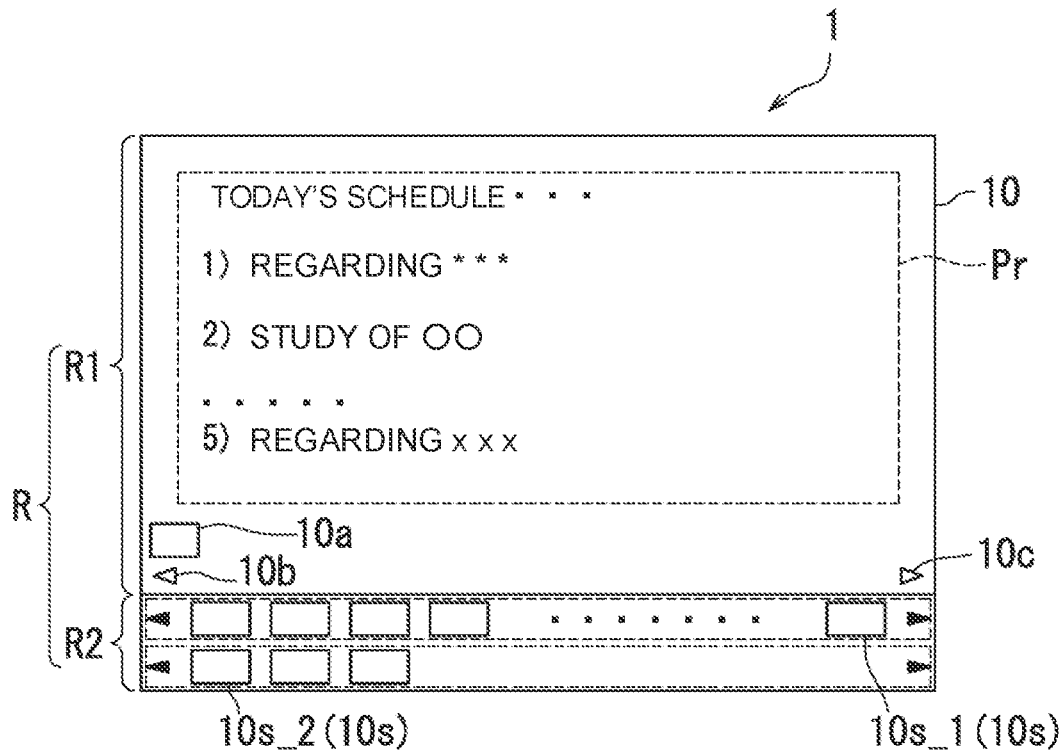
FIG. 8 is a schematic diagram showing the state in which a reproduction target image corresponding to one reduced image among a plurality of reduced images of FIG. 6C is displayed.
FIG. 9 is a table showing an example of reproduction image information of a second embodiment.

FIG. 8 is a schematic diagram showing the state in which a reproduction target image corresponding to one reduced image 10s among a plurality of reduced images 10s of FIG. 6C is displayed. In the first area R1, a reproduction target image Pr corresponding to the reduced image 10s which has been selected by the user is displayed, instead of the image (immediately preceding image) Pa drawn in the first area R1 of FIG. 6C.

Returning to FIG. 7, in the information processing device 1, the controller 16 causes the reproduction target image Pr (FIG. 8) to be displayed in the first area R1 until a touch operation signal indicating the touch operation of selecting the back icon 104 is acquired from the touch panel driver 14, that is, until a reproduction end operation is performed by the user (step S13: No). In a case where a touch operation signal indicating the touch operation of selecting the back icon 104 is acquired from the touch panel driver 14, that is, if the reproduction end operation is performed by the user (step S13: Yes), the controller 16 reinstates the first area R1 to the display state immediately before reproduction (step S14). Specifically, the controller 16 reads the immediately preceding image data stored in the memory, and outputs the image signal indicating the immediately preceding image data to the display panel driver 13 as the image to be displayed in the first area R1. The display panel driver 13 restores the display of the first area R1 to the state shown in FIG. 6C, on the basis of the image signal from the controller 16.

The information processing device 1 continues the first and second processing indicated in FIG. 5 until the user performs the touch operation of selecting the reduced image 10s in step S11 (step S11: No).

In the present embodiment, the image displayed in the first area R1 at the time when a specific touch operation has been performed is assumed as the reproduction target image, and the reduced image 10s of the reproduction target image is displayed in the second area R2. The specific touch operation corresponds to the operation of changing the color of the image being drawn, the operation of deleting the image, the operation of switching the pages, and the operation of ending the drawing. In particular, the operation of changing the color of the image being drawn, and the operation of switching the pages tend to be performed when a topic or a subject for discussion, etc., is to be changed. Further, the operation of deleting the image tends to be performed when a statement or the like is to be withdrawn or corrected. That is, the aforementioned touch operations are operations for changing the display state of the first area R1, and the display contents are likely to change greatly after such touch operations are performed. Accordingly, the user can store the reproduction target images before a change in the display state occurs by the touch operation by merely performing the aforementioned touch operations without needing to be conscious of storing them. As a result, as the user successively selects the reduced images 10s along time series and causes the reproduction target images to be displayed in the first area R1, a history to the current display state can be confirmed to some degree from a difference between before and after the change of the display state.

Second Embodiment

FIG. 9 is a table showing an example of reproduction image information 150A of a second embodiment. As shown in FIG. 9, the reproduction image information 150A is different from the reproduction image information 150 shown in FIG. 4 in that the reproduction image information 150A includes operation information. The operation information indicates the type of a specific touch operation. In step S2 of FIG. 5, if the touch operation signal indicates a specific touch operation, the operation information indicating the touch operation is associated with the time, reproduction target image ID, reduced image ID, and the page No., and stored in a storage 15.

More specifically, the operation information corresponds to information for identifying the touch operation on each of color selection icons 101a and 101b, a delete icon 102, an end icon 103, and page switching icons 10b and 10c.

In the present embodiment, the controller 16 sets "C" for the operation information when the touch operation indicated by the touch operation signal corresponds to a touch operation on the color selection icons 101a and 101b, and sets "D" for the operation information when the same corresponds to a touch operation on the delete icon 102. Further, the controller 16 sets "E" for the operation information when the touch operation indicated by the touch operation signal corresponds to a touch operation on the end icon 103, and sets "P" for the operation information when the same corresponds to a touch operation on the page switching icons 10b and 10c.

Figure 10:
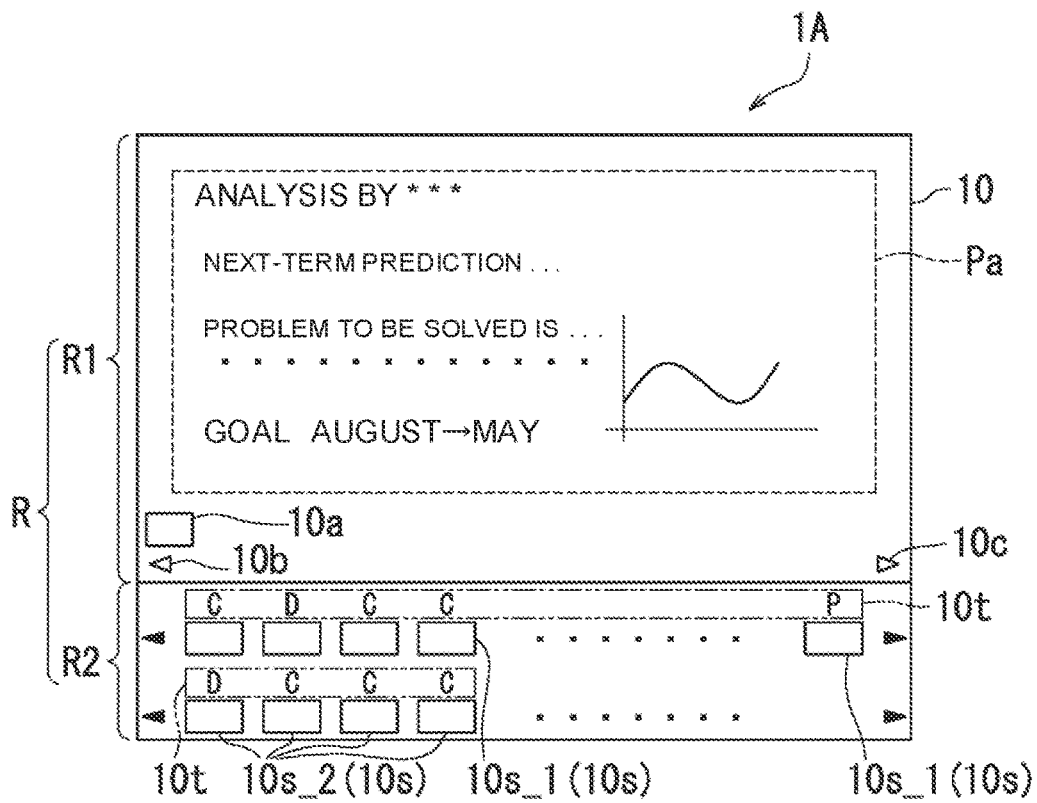
FIG. 10 is a schematic diagram showing a display example of an information processing device of the second embodiment.

The operation information in the reproduction image information 150A is used in thumbnailing processing of the second processing. FIG. 10 is a schematic diagram showing a display example of an information processing device 1A of the second embodiment. In FIG. 10, the same reference numbers as those of the first embodiment are assigned to the same configurations as those of the first embodiment. A configuration which is different from that of the first embodiment will be described.

As shown in FIG. 10, in a second area R2 of the information processing device 1A, an image indicating the operation information corresponding to a reduced image 10s is displayed in an area 10t above each of the reduced images 10s. That is, in step S3 of FIG. 5, the controller 16 outputs, to a display panel driver 13, an image signal indicating the reduced image 10s to be displayed in the second area R2, and an image signal indicating the operation information to be displayed in the area 10t above the reduced image 10s, on the basis of the reproduction image information 150A. The display panel driver 13 causes the reduced image 10s, and the image indicating the operation information corresponding to the reduced image 10s to be displayed in the second area R2, in the display panel 11, on the basis of the image signals from the controller 16.

As can be seen, as the image indicating the operation information is displayed for each reduced image 10s, the user can confirm which touch operation timing each reduced image 10s corresponds to. Consequently, as compared with the case where an image indicating the operation information is not displayed together with the reduced image 10s, the user can easily select the reduced image 10s to be reproduced, and display the desired reproduction target image in a first area R1.

In displaying the reproduction target image corresponding to the selected reduced image 10s in the first area R1, an image indicating the operation information corresponding to the selected reduced image 10s may be displayed together with the reproduction target image in the first area R1. As for the display mode of the image indicating the operation information in the first area R1, an image of characters, figures, illustrations, etc., representing the operation information may be applied. In short, it suffices that the operation information corresponding to the reproduction target image is represented in an identifiable manner in the first area R1.

The embodiments of the information processing device according to the present disclosure have been described above with reference to the drawings (FIGS. 1 to 10). However, the information processing device is not limited to that of the above-described embodiments, and may be embodied in various forms without departing from the gist of the present embodiments. The drawings mainly and schematically illustrate constituent elements of the present embodiments in order to facilitate the understanding thereof. Therefore, the thickness, length, and the number or the like of the constituent elements illustrated in the drawings are different from those of the actual modes for the sake of convenience of the illustration. Also, the shape, dimension, etc., of the constituent elements indicated in the above embodiments are merely examples, and no particular limitations are imposed thereon. That is, the constituent elements may be modified variously within the scope not substantially departing from the advantageous effect of the present disclosure. In the following, modifications of the above-described embodiments will be described.

Figure 11:
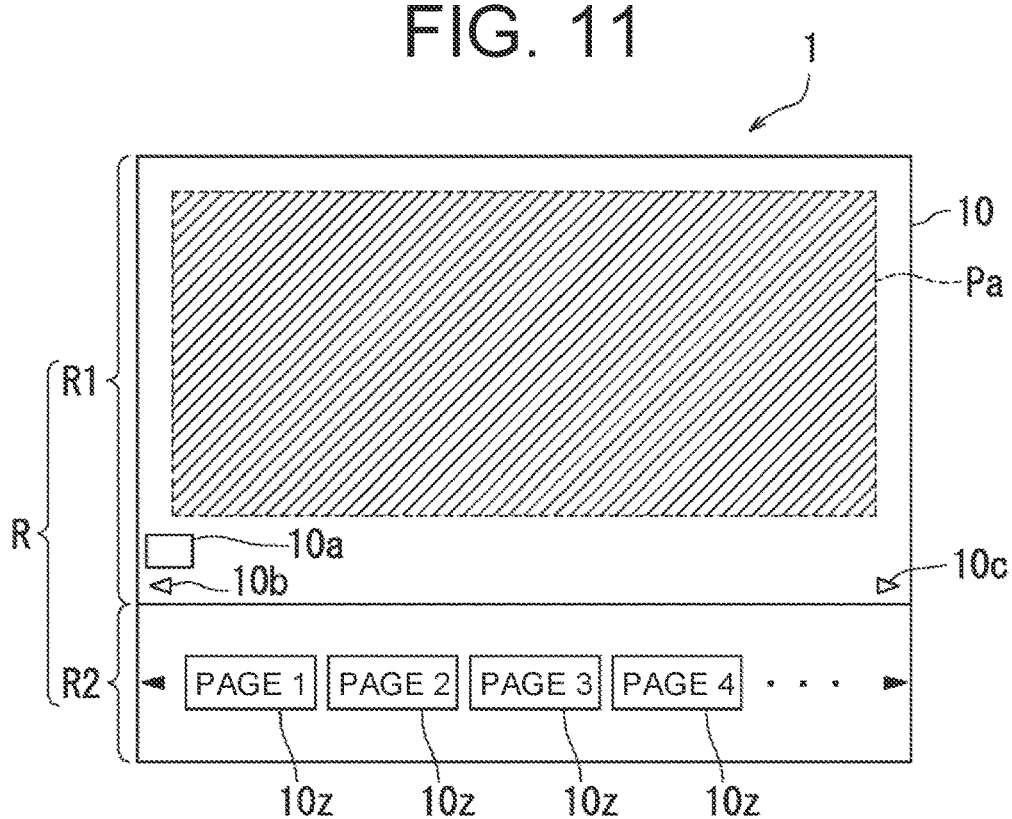
FIG. 11 is a schematic diagram showing a display example of the second area of Modification (1)

MODIFICATIONS (1) FIG. 11 is a schematic diagram showing a display example of a second area R2 of Modification (1). In FIG. 11, the same reference numbers as those of the first and second embodiments are assigned to the same configurations as those of the first and second embodiments. As shown in FIG. 11, the second area R2 displays icons 10z on which characters indicating the pages such as "Page 1", "Page 2", . . . , etc., are written.

The icon 10z on which the characters "Page 1" are written is associated with the page referenced as "1" of the page No. in the reproduction image information 150 and 150A. Also, the icon 10z on which the characters "Page 2" are written is associated with the page referenced as "2" of the page No. in the reproduction image information 150 and 150A. That is, the page written on the icon 10z represents one of the page Nos. of the reproduction image information 150 and 150A.

When a touch operation of selecting the icon 10z is performed, the controller 16 refers to the reproduction image information 150 or 150A, and outputs image signals indicating the reduced images 10s of the page No. corresponding to the selected icon 10z to the display panel driver 13. The display panel driver 13 causes the display panel 11 to display the reduced images 10s in the second area R2, on the basis of the image signals from the controller 16. In other words, the icon 10z is an icon in which a plurality of reduced image 10s corresponding to one page No. in the reproduction image information 150 and 150A are consolidated.

The number of reduced images 10s that can be displayed as a list in the second area R2 is limited. For this reason, in the reproduction image information 150 and 150A, in cases where the page Nos. exceed a certain number, or the number of reduced images 10s corresponding to one page exceeds a certain number, the controller 16 causes the icons 10z in which the reduced images 10s are consolidated for each page No. to be displayed as a list in the second area R2. By doing so, the user can easily find the desired reduced image 10s, and it is less troublesome to select the reduced image 10s.

Figure 12:
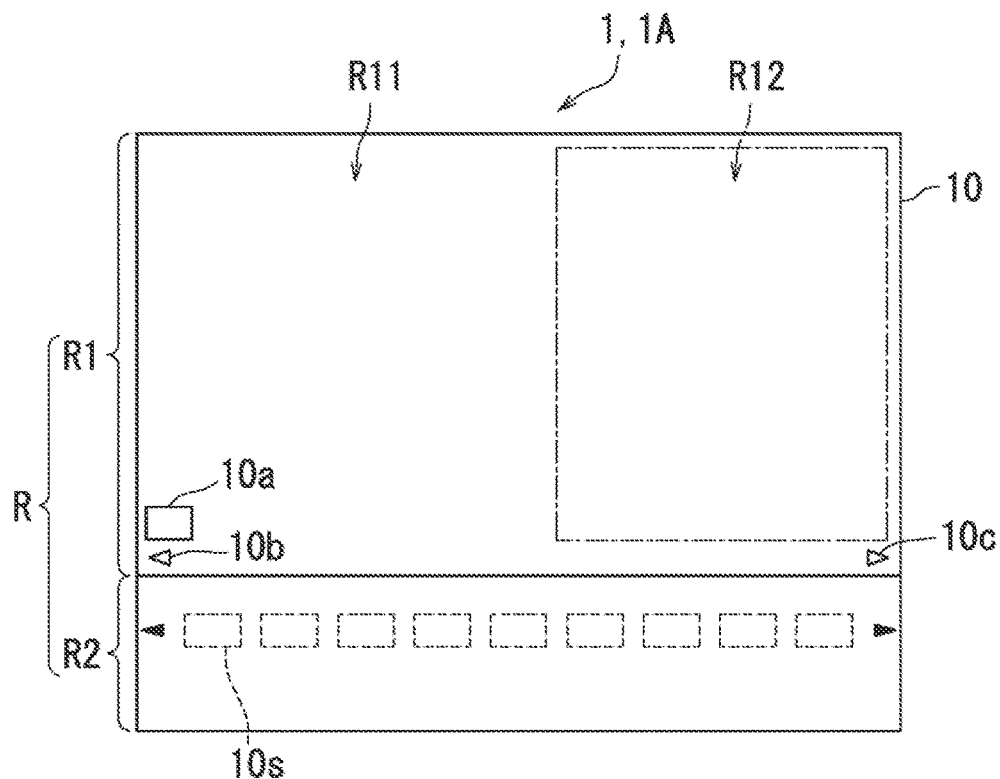
FIG. 12 is a schematic diagram showing the configuration of the first area of Modification (2)

(2) In the first and second embodiments, the image displayed in the entire drawing area of the first area R1 is stored in the storage 15 as the reproduction target image. However, only the image displayed in a partial area in the drawing area of the first area R1 may be stored in the storage 15 as the reproduction target image. FIG. 12 is a schematic diagram showing the configuration of the first area R1 of Modification (2).

As shown in FIG. 12, in the information processing devices 1 and 1A, the first area R1 includes an area R11 and an area R12. In FIG. 12, the area R12 corresponds to a predetermined area in which an image to be assumed as the reproduction target image is displayed. Note that the size and the position of the area R12 are not limited to the size and the position shown in FIG. 12. It suffices that the area R12 is a part of the area of the first area R1. In the following, the first processing of the present modification will be described.

Figure 13:
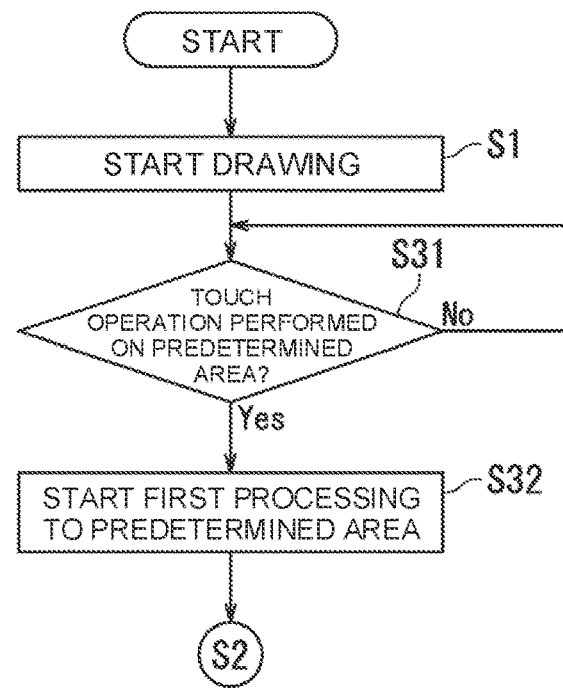
FIG. 13 is a diagram showing an operation flow of the first processing in Modification (2).

FIG. 13 is a diagram showing an operation flow of the first processing in Modification (2). The information processing devices 1 and 1A start the drawing in the first area R1 in response to the user's touch operation (step S1). When the user performs the touch operation to the area R12 (predetermined area), a touch operation signal indicating the touch operation on the area R12 is output from the touch panel driver 14 to the controller 16 (step S31: Yes), and the controller 16 starts the first processing to the area R12 (step S32). More specifically, the controller 16 outputs, to the display panel driver 13, the image signal to be displayed in the area R12 on the basis of the touch operation signal indicating the user's touch operation, and causes the display panel driver 13 to display an image in the area R12 of the display panel 11.

After that, the information processing devices 1 and 1A perform the processing of steps S2 to S4 of FIG. 5 and perform the second processing. That is, every time the specific touch operation is performed, the controller 16 assumes the image displayed in the area R12 as the reproduction target image, and stores the reproduction target image data, and the reduced image data of the reproduction target image in the storage 15. Further, the controller 16 sequentially updates the reproduction image information 150 and 150A, and performs the display with the reduced image added to the second area R2.

As described above, by setting a partial area in the drawing area of the first area R1 to a target area (recording area) of the reproduction target image, the amount of data of the reproduction target image to be stored in the storage 15 can be reduced, as compared with the case where the entire drawing area is set to the recording area.

Note that the information processing devices 1 and 1A may be configured such that the user is allowed to set in advance which of the entire drawing area of the first area R1 and the area R12 is to be the recording area of the reproduction target image. Specifically, for example, before starting the drawing, the controller 16 may display, in the display area R, a selection screen for receiving selection of whether or not to set the area R12 to the recording area by a predetermined operation by the user.

(3) The information processing devices 1 and 1A may be made to perform the processing of step S3 when a specific touch operation has been performed in step S2 of FIG. 5, or when a touch operation by the user is not performed for a certain period of time or more continuously. More specifically, the information processing devices 1 and 1A measure the time taken until the next touch operation signal is acquired after a touch operation signal has been acquired from the touch panel driver 14, in other words, the time during which a stylus or the like is not in contact with the first area R1. Further, when the measured time has passed a certain period of time, the information processing devices 1 and 1A assume the image displayed in the first area R1 or the area R12 (predetermined area) as the reproduction target image, and perform the processing of step S3.

(4) In the information processing devices 1 and 1A, an application program other than the drawing APS (hereinafter referred to as the other APS) may be installed. In this case, when the drawing APS and the other APS are started, the drawing application screen and a screen of the other APS may be displayed in the display area. That is, the information processing devices 1 and 1A may display the drawing application screen over the screen of the other APS, or may display the screen of the other APS and the drawing application screen side by side. In this case, the information processing devices 1 and 1A may perform the second processing when the operation of switching the screen from the drawing application screen to the screen of the other APS is performed, or when the operation of starting the other APS after the drawing APS has been started is performed. In other words, the specific operation may include the operation of switching the screen from the drawing application screen to the screen of the other APS, and the operation of starting the other APS after the drawing APS has been started. Note that when the drawing application screen is displayed over the screen of the other APS, the first area R1 of the drawing application screen may be constituted by a transparent layer.

(5) In the information processing devices 1 and 1A, as for a background color of the drawing application screen, the display may be realized with a color other than white (for example, black or green). When the drawing application screen is started, the information processing devices 1 and 1A write an image signal corresponding to the color of the drawing area set in advance to the drawing area.

(6) In the information processing devices 1 and 1A, information such as the conference name and the name of a subject for discussion that have been set by the user, and file information of the reproduction target image data, for example, other than time, reproduction target image ID, reduced image ID, and the page No., may be associated with each other and stored in the reproduction image information 150.

(7) In the information processing devices 1 and 1A, a label icon for setting a label to the drawing contents, for example, may be displayed in the first area R1. The label may be one to represent, for example, the type of the drawing contents (importance, urgency, conclusion, problem to be solved, etc.). When any one of the label icons is selected by the user, the information processing devices 1 and 1A temporarily store label information indicating the selected label icon in association with the image data displayed in the drawing area. When a specific touch operation is performed by the user, the information processing devices 1 and 1A may include the label information in the reproduction image information 150 and 150A in storing the reproduction image information 150 and 150A, and cause the reduced image 10s to be displayed in the second area R2 in an identifiable manner, on the basis of the label information.

(8) In the information processing devices 1 and 1A, every time the reduced image 10s is selected in step S11 of FIG. 7, the number of times of selection of the selected reduced image 10s may be counted, and the reduced image 10s may be stored in association with the number of times of selection. Further, the display mode of each of the reduced images 10s to be displayed in the second area R2 may be varied, according to the number of times of selection of the reduced image 10s. Specifically, for example, an image of a mark or a numerical value corresponding to the number of times of selection may be displayed together with the reduced image 10s, or a frame line surrounding the reduced image 10s may be displayed in a color corresponding to the number of times of selection.

The invention claimed is:

1. An information processing device comprising:
a display panel comprising a display area including a first area and a second area;
an operation receiving section which receives a user operation;
a controller which performs first processing of displaying, when a first input operation on the first area is received as the user operation, an image based on the first input operation in the first area; and
a storage, wherein:
the controller further performs second processing and third processing in response to the user operation,
the second processing corresponds to processing of causing, when a second input operation different from the first input operation is received as the user operation on the operation receiving section, a first image and a second image to be stored in the storage, the first image being displayed in the first area, the second image being a reduced image of the first image, and displaying the second image in the second area,
the third processing corresponds to processing of causing, when a third input operation of selecting the second image is received as the user operation on the operation receiving section, the first image corresponding to the selected second image to be displayed in the first area, instead of the image being displayed in the first area, the third input operation being different from the first input operation and the second input operation, and
in the second processing, the controller causes operation information indicating a type of the user operation to be stored in the storage in association with the second image, and in the second processing, the controller further causes the second image to be displayed in the second area together with an image indicating the type of the user operation corresponding to the second image based on the operation information.

2. The information processing device according to claim 1, wherein in the second processing, the controller assumes an image displayed in a partial area in the first area as the first image, and in the third processing, the controller causes the first image corresponding to the selected second image to be displayed in the partial area, instead of the image being displayed in the partial area.

3. The information processing device according to claim 1, wherein:
the second input operation includes at least one of a first operation, a second operation, and a third operation,
the first operation corresponds to an operation of giving an instruction regarding a selection of a color of an image drawn in accordance with the first input operation,
the second operation corresponds to an operation of giving an instruction for deleting the image displayed in the first area, and
the third operation corresponds to an operation of giving an instruction for switching, when the first area is assumed as one page, the page.

4. The information processing device according to claim 3, wherein in the second processing, the controller groups the first image and the second image in units of pages, and further causes the second image to be displayed in the second area in the units of pages.

5. An information processing device comprising:
a display panel comprising a display area including a first area and a second area;
an operation receiving section which receives a user operation;
a controller which performs first processing of displaying, when a first input operation on the first area is received as the user operation, an image based on the first input operation in the first area; and
a storage, wherein:
the controller further performs second processing and third processing in response to the user operation,
the second processing corresponds to processing of causing, when a second input operation different from the first input operation is received as the user operation on the operation receiving section, a first image and a second image to be stored in the storage, the first image being displayed in the first area, the second image being a reduced image of the first image, and displaying the second image in the second area,
the third processing corresponds to processing of causing, when a third input operation of selecting the second image is received as the user operation on the operation receiving section, the first image corresponding to the selected second image to be displayed in the first area, instead of the image being displayed in the first area, the third input operation being different from the first input operation and the second input operation, and
in the second processing, the controller causes operation information indicating a type of the user operation to be stored in the storage in association with the second image, and
in the third processing, the controller causes the first image corresponding to the selected second image to be displayed in the first area together with an image indicating the type of the user operation corresponding to the selected second image based on the operation information.

6. A display method comprising:
causing, when a first input operation on a first area is received by an operation receiving section as a user operation on a display area including the first area and a second area, a controller to display an image based on the first input operation in the first area;
causing, when a second input operation different from the first input operation is received as the user operation on the operation receiving section, the controller to store a first image and a second image in a storage, the first image being displayed in the first area, the second image being a reduced image of the first image;
causing the controller to display the second image in the second area; and causing, when a third input operation of selecting the second image is received as the user operation on the operation receiving section, the controller to display the first image corresponding to the selected second image in the first area, instead of the image being displayed in the first area, the third input operation being different from the first input operation and the second input operation, wherein:

the causing the controller to store the first image and the second image in the storage includes causing the controller to further store operation information indicating a type of the user operation in the storage in association with the second image, and causing the controller to display the second image in the second area includes causing the controller to display the second image in the second area together with an image indicating the type of the user operation corresponding to the second image based on the operation information.

7. The display method according to claim 6, wherein the causing the controller to store the first image and the second image in the storage includes causing the controller to further store an image displayed in a partial area, in the first area, in the storage as the first area, and the causing the controller to displaying the first image corresponding to the selected second image in the first area includes causing the controller to display the first image corresponding to the selected second image in the partial area, instead of the image being displayed in the partial area.

8. The display method according to claim 6, wherein:

the second input operation includes at least one of a first operation, a second operation, and a third operation, the first operation corresponds to an operation of giving an instruction regarding a selection of a color of an image drawn in accordance with the first input operation, the second operation corresponds to an operation of giving an instruction for deleting the image displayed in the first area, and the third operation corresponds to an operation of giving an instruction for switching, when the first area is assumed as one page, the page.

9. The display method according to claim 8, wherein the causing the controller to display the second image in the second area includes:

causing the controller to group the first image and the second image in units of pages; and causing the controller to display the second image in the second area in the units of pages.

10. A display method comprising:

causing, when a first input operation on a first area is received by an operation receiving section as a user operation on a display area including the first area and a second area, a controller to display an image based on the first input operation in the first area;

causing, when a second input operation different from the first input operation is received as the user operation on the operation receiving section, the controller to store a first image and a second image in a storage, the first image being displayed in the first area, the second image being a reduced image of the first image;

causing the controller to display the second image in the second area; and causing, when a third input operation of selecting the second image is received as the user operation on the operation receiving section, the controller to display the first image corresponding to the selected second image in the first area, instead of the image being displayed in the first area, the third input operation being different from the first input operation and the second input operation, wherein:

the causing the controller to store the first image and the second image in the storage includes causing the controller to further store operation information indicating a type of the user operation in the storage in association with the second image, wherein the causing the controller to display the first image corresponding to the selected second image in the first area includes causing the controller to display the first image corresponding to the selected second image in the first area together with an image indicating the type of the user operation corresponding to the selected second image based on the operation information.

* * * * *